May 29, 1951  E. WALDER  2,554,761
HANDLE STRUCTURE
Filed Oct. 17, 1947
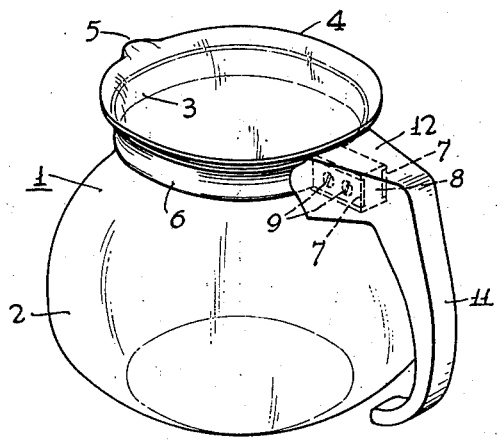
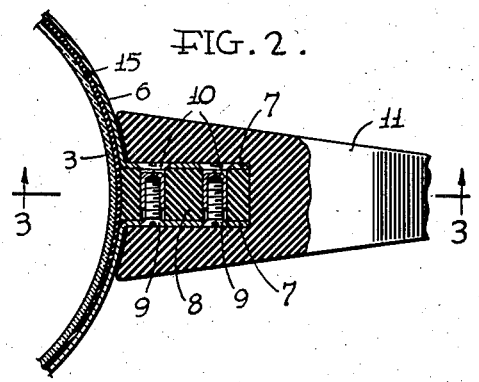
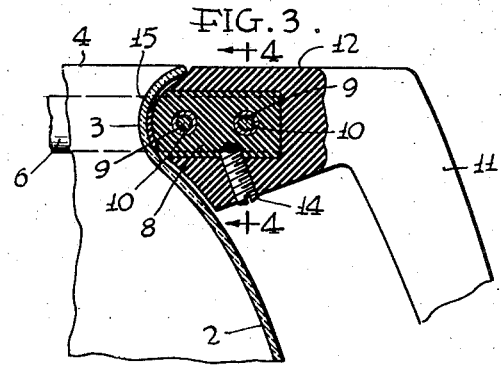
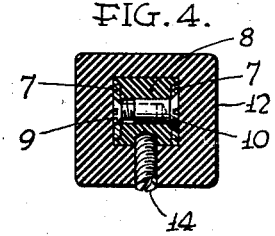
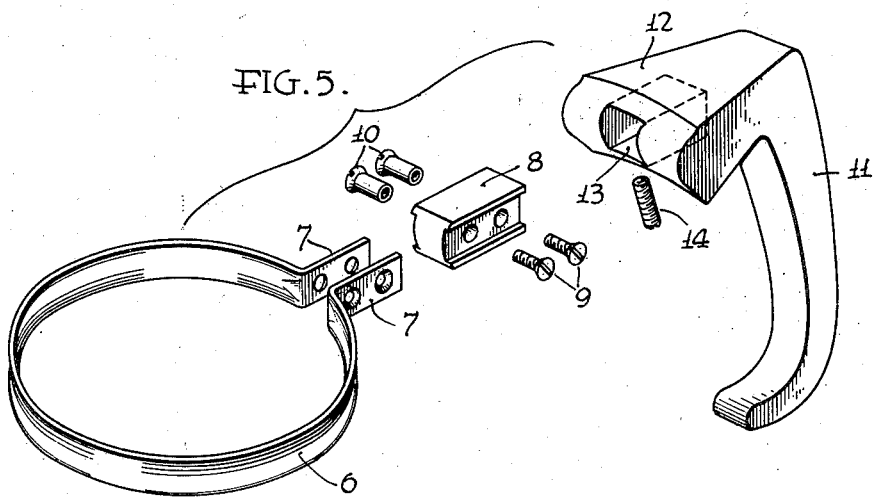
Inventor ÷
Emil Walder
by his Attorneys
Howson & Howson Patented May 29, 1951

2,554,761

UNITED STATES PATENT OFFICE 2,554,761

HANDLE STRUCTURE

Emil Walder, Philadelphia, Pa., assignor to Proctor Electric Company, Philadelphia, Pa., a corporation of Pennsylvania Application October 17, 1947, Serial No. 780,333

4 Claims. (Cl. 294—27)

This invention relates to handles for dispensing containers, such as bowls which are supplied as one of the components of coffee-making devices.

Dispensing containers of the type herein described are usually of glass, and are adapted to pouring, having a neck and a pouring spout. These containers are of the type with which a handle is used, and to which the handle is attached by means of a neck-encircling band of metal having ends which terminate at the handle in a manner to securely hold the band in close contact about the neck of the container.

The principal object of this invention is the provision of a handle structure and securing means for a dispensing container which shall be free of projecting heat conducting elements and shall effectively shield these elements, by means of low heat conducting material, from the hand of the user.

An object of this invention is the provision of a handle-securing means for a dispensing container which shall be of simple manufacture and shall be easily assembled on the container.

Another object of this invention is the provision of a handle grip for dispensing container having an opening into which the flexible ends of the neck-encircling band may be inserted and rigidly secured, thereby securely retaining the handle to the container.

With these advantages and objects in view, as well as others which will be made apparent, this invention consists of the novel features of construction, arrangement, and combination of parts hereinafter fully described.

The invention is clearly illustrated in the drawing which accompanies this specification, and in which:

Fig. 1 is a perspective view of a dispensing container equipped with a handle in accordance with the invention;

Fig. 2 is a horizontal sectional view taken through the neck of the container and the associated handle;

Fig. 3 is a vertical cross-sectional view taken on line 3—3 of Fig. 2;

Fig. 4 is a detail cross-sectional view through the handle on line 4—4 of Fig. 3; and Fig. 5 is an exploded view showing the neck-encircling and the handle parts associated therewith.

Referring to the drawing, and first to Fig. 1, which illustrates a dispensing container according to this invention, the container 1, preferably of glass, is formed having a bowl portion 2 terminating at its upper end in a neck 3, which is flared to a lip 4 provided with a pouring spout 5 through which the liquid contents of the container may be dispensed.

Substantially encircling the neck of the container, is an open loop of thin metal 6, such as plated steel, from the ends of which extend a pair of apertured legs 7. These legs are secured to an apertured block 8 of low thermal conductivity by means of male and female screws 9 and 10. The block 8 is preferably grooved, as shown in Fig. 5 to accommodate the extending legs 7, so that the sides of the legs are flush with the sides of the block.

The handle grip 11, preferably composed of material of low heat conductivity, has an extension member 12 in which a recess 13 is provided to accommodate the block 8. A set screw 14 is provided in the under side of the handle extension 12 to retainingly engage the block 8 after assembly in the opening 13. As may be seen in Figs. 3 and 4, the block 8 is preferably recessed to receive the end of screw 14.

A pliable rubber band or cushion 15 is placed about the neck of the container beneath the encircling loop 6 so as to provide a resilient base for the loop, and to provide for the minor irregularities in the diameter of the neck, such as occur in manufacture.

In assembling the components of the device, the rubber cushion 15 is first placed around the neck 3 of the container 1. The encircling band 6 is then assembled similarly about the neck of the container, and its extending legs 7 are secured to the block 8 by means of screws 9 and 10. The handle 11 is then placed over the assembled block 8 and legs 7, and is secured thereto by the set screw 14.

It will be apparent from the above description and the drawing that this handle structure provides an easily assembled combination, free of projections and visible fastenings.

It is to be understood that the invention is not limited to the exact form, construction, arrangement, and combination shown herein, it being obvious that various modifications may be made without departing from the spirit of the invention.

I claim:

1. A handle structure for a dispensing container having a neck, comprising a loop adapted to be placed around the neck of the container and terminating in two legs extending from said neck, a securing block disposed between said extending legs and secured thereto, a handle grip of low heat conductivity material having a recess therein to receive and to enclose said securing block and extending legs, and locking means on said handle grip to retain said securing block and extending legs within said recess.

2. A handle structure for a dispensing container having a neck, comprising an open band adapted to substantially encircle the neck of the container and terminating in two extending end members, a block disposed between the extending end members of the encircling band, means for securing the extending end members to said block, a handle grip of low heat conductivity material with an extension adapted to receive and to enclose said block and the extending end members secured thereto, and locking means on the handle grip extension to retain said block and the extending end members secured thereto.

3. A handle structure for a utensil having an embraceable portion, comprising an open metal band substantially encircling said portion and having two extending end portions substantially parallel to one another, a block of low heat conductivity material disposed between said end portions and substantially coextensive therewith, screw fastening means securing said end portions to said block, a handle grip of low heat conductivity material having a socket portion with a recess substantially coextensive with the assembled block and end portions, said block and end portions extending into said recess, so that said socket portion encloses the entire projecting assembly including said screw fastening means, and screw fastening means securing said block and said handle grip together but being free of engagement with said end portions.

4. A handle structure for a utensil having an embraceable portion, comprising an open metal band substantially encircling said portion and having two extending end portions substantially parallel to one another, a block of low heat conductivity material disposed between said end portions and substantially coextensive therewith, screw fastening means securing said end portions to said block, a handle grip of low heat conductivity material having a laterally extending socket portion with a recess substantially coextensive with the assembled block and end portions, said block and end portions extending into said recess, so that said socket portion encloses the entire projecting assembly including said screw fastening means, and screw fastening means extending through the lower part of said socket portion and engaging said block but being free of engagement with said end portions.

EMIL WALDER.

REFERENCES CITED

The following references are of record in the file of this patent:

UNITED STATES PATENTS

| Number | Name | Date |
|---|---|---|
| 2,205,819 | Mattoon | June 25, 1940 |
| 2,422,510 | Ward | June 17, 1947 |

FOREIGN PATENTS

| Number | Country | Date |
|---|---|---|
| 463,866 | France | Dec. 27, 1913 |